United States Patent Office 3,438,878
Patented Apr. 15, 1969

3,438,878
SIMULTANEOUS REFINING OF ZINC AND
MANGANESE DIOXIDE
Donald K. Bell, Toronto, Ontario, and Graham Edward
Brown, Scarborough, Ontario, Canada, assignors to
Union Carbide Canada Limited, Toronto, Ontario, Canada, a company of Canada
No Drawing. Filed Oct. 27, 1966, Ser. No. 589,825
Int. Cl. C22d *1/22;* B01k *3/02;* C01g *45/02*
U.S. Cl. 204—83                                12 Claims This invention relates to electrolytic processes for the simultaneous production of zinc and manganese dioxide, and has to do particularly with an electrolytic process for simultaneously producing battery grade $MnO_2$ and commerically acceptable zinc.

Due to the gradual depletion of naturally occurring battery grade manganese dioxide and the increased requirement for improved performance, increasing amounts of electrolytic manganese dioxide are being used in dry batteries. Electrolytic manganese diode costs about three times as much as naturally occurring oxide, and although it enables the manufacturer to produce an improved battery, it does result in a substantial increase in factory cost.

Existing processes for manufacturing battery grade electrolytic manganese dioxide consist generally of the following steps:

(1) Calcining available manganese ore to convert $MnO_2$ to $MnO$.

(2) Leaching the MnO in dilute $H_2SO_4$ to produce a manganese sulphate solution.

(3) Filtering and purifying the manganese sulphate solution if required.

(4) Plating manganese dioxide ($MnO_2$) on a titanium, a graphite or a lead anode in an electrolytic cell, at 90–96° C. and a current density of about 7–20 amperes per sq. ft.

(5) Stripping, grinding, washing and drying the resulting plate.

The conventional method for electrolytically refining zinc is to employ a zinc cell using a zinc sulphate solution as the electrolyte. It is usual for manganese dioxide to be added to the zinc sulphate solution for the purpose of oxidizing and precipitating any ferrous iron that may be present in the solution. As a result, a small amount of manganese sulphate is present in the zinc sulphate solution. In the conventional zinc cell, zinc is plated out on an aluminum cathode while a small amount of manganese dioxide comes out as a slime on the anode.

On a number of occasions attempts have been made to utilize the manganese dioxide produced during the zinc refining for dry batteries, but these attempts have always failed, for the following reasons:

(1) The material produced was usually heavily contaminated with lead (up to about 20%). Cells made from this material deteriorated rapidly, presumably due to the formation of lead trees that internally short-circuited the battery.

(2) The structure of the manganese dioxide was cryptomelane rather than the desired battery-active gamma phase.

(3) The density of the material was low and the particle size extremely small.

One example of the prior art in this field is U.S. Patent No. 1,055,158 to French, which describes an electrolytic process for making zinc and manganese dioxide, and which specifies that the electrolyte to be used contains sodium sulphate. The presence of alkali metals like sodium or potassium, however, results in the manganese dioxide having a crytomelane rather than the desired gamma-rho structure, and it is thus likely that the product under the French patent would be unsuitable for battery use. In this connection, it should be noted that military grade manganese dioxide is defined in U.S. Signal Corps Specification SCL–3175 dated July 28, 1955, which, among other things, limits the total alkali metal to 0.5% max., and states that the material after grinding and washing shall consist predominantly of a meso-crystalline phase type of manganese dioxide in the gamma-rho structural range.

It has now been found that it is possible to produce battery active gamma type manganese dioxide and zinc simultaneously in an electrolytic cell, and such production is a principal object of this invention.

At first sight, the simultaneous production of these materials might not appear to be feasible. Manganese dioxide users are very concerned about impurities such as lead, molybdenum, copper, etc., in the oxide, and to try to plate $MnO_2$ from an electrolyte containing a large amount of zinc probably would not appear to be the thing to do. Moreover, there is a substantial difference between the temperatures and the current densities used for the separate electrolytic operations for producing zinc and $MnO_2$, as will be clear from Table I below:

TABLE I

|  | Zinc Plating | Manganese Dioxide Plating |
| --- | --- | --- |
| Temperature | 35–45° C | 90–96° C. |
| Electrolyte | 2 molar $ZnSO_4$ | 1–2 molar $McSO_4$. |
| Current Density | 30–50 amps./sq. ft. | 7–20 amps./sq. ft. |
| Percent Strip | 50% | 40%. |
| Anode Material | Lead | Graphite, lead, titanium. |
| Cathode Material | Aluminium | Graphite, lead. |

The germ of the present invention was the discovery that in the usual electrolytic cells for the production of zinc, the manganese dioxide will start to form an adherent plate on the anode at a temperature of about 45° C. Below this temperature the manganese dioxide is formed as a relatively amorphous slime on the anode, showing no particular crystal pattern. Above this temperature and up to the boiling point of the electrolyte, the plate is essentially of the gamma form. Since manganese dioxide particles will oxidize and dissolve the zinc plate, it is desirable to form and immobilize the $MnO_2$ as a solid plate on the anode. Generally speaking, the higher the temperature the better the $MnO_2$ plating conditions. X-ray diffraction patterns reveal that the degree of crystallinity of the $MnO_2$ increases with increasing temperature. Also the current efficiency at the anode steadily increases with increasing temperature and decreasing current density. Theoretically, it should be possible to operate up to the boiling point of a 2-normal solution (approximately 120° C.) and if one were to consider only the quality of the $MnO_2$, the full range of from about 45° C. to about 120° C. would be satisfactory.

However, other considerations, particularly having to do with the zinc, conspire to restrict the preferred temperature range to one of from about 75° C. to about 100° C. In the first place, at temperatures below about 75° C., the efficiency of the cathode is low due to manganese dioxide particles and graphite particles in the electrolyte reacting with the zinc plate. The graphite particles adhere to the zinc cathode sheet, set up local corrosion cells and thereby reduce the current efficiency of the cathode. The current efficiency improves up to about 75° C. as the character of the $MnO_2$ plate improves, but at 75° C. the efficiency again starts to drop off due to the increased rate at which the sulphuric acid tends to dissolve the zinc. Above 96° C. the problems of material handling, evaporation, corrosion, and redissolution of the zinc becomes increasingly severe, although it is believed possible with improved cell constructions to operate satisfactorily at temperatures up to 100° C.

For the process according to this invention, the concentration of the manganese sulphate should lie between about 0.5 molar and about 2.6 molar, the preferred range being from about 0.7 molar to about 1.6 molar. The zinc ion (zinc sulphate) concentration should lie between about 0.4 molar and about 2.6 molar, the preferred range being from about 0.4 molar to about 1.6 molar. There must be a sufficiently high concentration of both zinc sulphate and manganese sulphate to limit concentration polarization, and this is the consideration upon which the lower concentration limits given above are based. Beyond the upper limits given above, restrictions are met with due to solubilities.

Anode materials that have been investigated are graphite, lead and titanium. With regard to the use of titanium, there are certain conditions which should be observed in order to permit higher current densities without passivation. Firstly, the temperature should be at least 90° C. Secondly, the Mn++ ion concentration should be maintained at a reasonably high level. 1.6 molar MnSO_4 feed stocks have been found to work satisfactorily with titanium anodes. With a high temperature and a high Mn++ ion concentration, it is possible to operate with a titanium anode at current densities of up to 25 amps. per sq. ft. without passivation.

Lead as an anode material is inexpensive, but tends to contaminate the manganese dioxide. It might be practical to use lead, however, provided the anode could be protected from corrosion above the solution line.

Graphite is the most commonly used substance commercially, and is quite acceptable as an anode material for the present process.

It will be appreciated that other materials such as platinum could be used as the anode as would be apparent to those skilled in the art.

The cathode material is usually high purity aluminum. Presumably, zinc sheets could be used. However, the zinc plating cycle is usually limited to 24 to 36 hours, due to a lowering of the hydrogen over-voltage caused by impurities in the electrolyte. As a result, strippable aluminum cathodes appear considerably more economical.

The current densities employed do not appear to be critical as far as the quality of the products is concerned. However, as the current density goes up, the anode efficiency goes down and the cathode efficiency goes up. Thus, the economic operation of the process will require that current densities be maintained within certain ranges. It has been found advisable to restrict the anode current density to a range of between about 5 and about 25 amps./sq. ft., and cathodic current densities in the range between 5 and 50 amps./sq. ft. are considered permissible.

A further consideration important to the process according to this invention is solution purity. In conventional zinc plating it is necessary to remove such impurities as nickel, copper, cobalt, arsenic, antimony and cadmium before zinc can be successfully plated. Purification is usually accomplished by established procedures such as the addition of small quantities of zinc dust.

For the process according to the present invention, similar purity levels should be maintained, as would be assumed by those skilled in the art. By way of example only, the following tables shows the impurity analysis of a solution with which successful plating of Zn and MnO_2 has been carried out. This table is not necessarily to be taken as representing the maximum impurity levels with which the process of this invention can be successfully worked:

| | |
|---|---|
| Cu | mg./l_ _ 1.5 |
| Cd | mg./l_ _ 5.0 |
| Pb | mg./l_ _ 0.5 |
| Fe | Trace |
| Co | Trace |
| Ni | Trace |
| As and Sb | Trace |

Accordingly, this invention involves a process for the simultaneous electrolytic production of battery active manganese dioxide and zinc comprising the steps of, charging an aqueous solution of manganese sulphate and zinc sulphate in concentrations sufficient to limit concentration polarization into an electrolytic cell having a cathode upon which zinc can be plated and an anode upon which manganese dioxide can be plated, the anode material being chosen from among: (1) graphite, (2) lead, (3) titanium, heating the cell and its contents to a temperature within a range of which the upper limit is about 100° C. and of which the lower limit is (a) about 75° C. when the anode material is chosen from among (1) graphite and (2) lead, and (b) about 90° C. when the anode material is titanium, and causing a current to flow between the anode and the cathode.

The overall cell reaction can be written:

$$MnSO_4 + ZnSO_4 + 2H_2O \rightarrow Zn + MnO_2 + 2H_2SO_4$$

The cathode reaction can be represented as:

$$Zn^{++} + 2e \rightarrow Zn$$

The anode reaction can be represented as:

$$Mn^{++} + 2H_2O \rightarrow MnO_2 + 4H^+ + 2e$$

It is normally necessary to strip the zinc off the aluminum cathodes every 24 hours. This length of time is limited by the length of time that the zinc can be plated efficiently. Essentially, trace impurities in the electrolyte collect on the zinc and reduce the over-voltage to the point where hydrogen is evolved instead of zinc being plated. Cathodic impurities also accelerate the corrosion of the zinc in the acid electrolyte, with the result that the zinc already plated will dissolve.

The anode, on the other hand, need not be stripped as frequently. Once a week is usually sufficient. The plating time is not critical, plating times up to 30 days having been reported commercially.

The removal of plated materials from the electrodes is usually a hand operation. With a little scraping, the zinc can be peeled from the aluminium sheet quite easily since the deposit is flexible and is only approximately 1/16 inch thick.

The manganese dioxide deposit is quite hard and brittle and it is approximately 3/8 inch thick. It can be chipped off graphite electrodes or broken from metal electrodes by flexing and scraping.

The term "percent strip" refers to the percentage of zinc or manganese removed from the electrolyte in one cycle. If, for example, the electrolyte initially contained approximately one molecular weight of zinc sulphate and one molecular weight of manganese sulphate per litre, then the removal of 0.2 mole of ZnSO_4 and 0.2 mole of MnSO_4 would be referred to as a 20% strip. Following the stripping, the electrolyte is recycled through the ore leaching reaction. In the following Examples 1 and 2, the percent strip is the percent of manganese removed in one cycle.

Example 1

| | |
|---|---|
| Temperature | 84° C. |
| Electrolyte | 150 gms. MnSO_4 + 161 gms. ZnSO_4 per litre. |
| Anode current density | 10 amps./sq. ft. |
| Anode current efficiency | 79.5%. |
| Anode material | Graphite. |
| Cathode current density | 15 amps./sq. ft. |
| Cathode material | Aluminium. |
| Percent strip | 15–25%. |

Example 2

| | |
|---|---|
| Temperature | 94–96° C. |
| Electrolyte | 1 M ZnSO_4 + 1 M MnSO_4. |
| Anode current density | 12 amps./ft. |
| Anode current efficiency | 79.5%. |
| Anode material | Graphite. |

Example 2—Continued

Cathode current density ____ 15 amps./sq. ft.
Cathode material _____ Aluminium.
Percent strip _____ 15–25%.

Example 3

Temperature _____ 94–96° C.
Electrolyte _____ 1 M $ZnSO_4$ + 1 M $MnSO_4$.
Anode current density _____ 12 amps./ft.$^2$.
Anode current efficiency ___ 91%.
Anode material _____ Titanium-palladium alloy.
Cathode current density ___ 12 amps./ft.$^2$.
Cathode current efficiency __ 95%.
Cathode material _____ Aluminium.
Time:
    Anode _____ 7 days.
    Cathode _____ 24 hours.

Table 1 summarizes data recorded for several test runs conducted at temperatures from 45° C. to 85° C.:

TABLE NO. 1

| | 45° C | 55° C | 65° C | 75° C | 85° C |
|---|---|---|---|---|---|
| Temperature | 45° C | 55° C | 65° C | 75° C | 85° C |
| Electrolyte | $ZnSO_4$+.7 mols $MnSO_4$ | $ZnSO_4$+.7 mols $MnSO_4$ | $ZnSO_4$+.7 mols $MnSO_4$ | $ZnSO_4$+.7 mols $MnSO_4$ | $ZnSO_4$+.7 mols $MnSO_4$ |
| Anode Current Density | 10 amp./sq. ft | 10 amp./sq. ft | 10 amp./sq. ft | 10 amp./sq. ft | 10 amp./sq. ft |
| Anode Current Efficiency | 1% | 10% | 30% | 38% | 50% |
| Anode Material | Graphite | Graphite | Graphite | Graphite | Graphite |
| Cathode Current Density | 10 amp./sq. ft | 10 amp./sq. ft | 10 amp./sq. ft | 10 amp./sq. ft | 10 amp./sq. ft |
| Cathode Current Efficiency | 1% | 40% | 64% | 80% | 70% |
| Cathode Material | Aluminum | Aluminum | Aluminum | Aluminum | Aluminum |
| Time | 20 hrs | 20 hrs | 20 hrs | 20 hrs | 20 hrs |
| Surface area of $MnO_2$ | 142 m.$^2$/g | | | 123 m.$^2$/g | 116 m.$^2$/g |

In Table 1 it will be noted that anode current efficiencies increase with increasing temperature. It will also be noted that the surface area of the $MnO_2$ decreases from about 142 sq. metres per gm. at 45° C. to about 116 sq. metres per gm. at 85° C. The higher the surface area, the lower the apparent density. This results in a loss in terms of the number of grams of $MnO_2$ that can be packed into a cell of given size. It will further be noted that the cathode current efficiency is very low at 45° C. and increases as the temperature rises to about 75°, above which temperature the cathode current efficiency again starts to decrease.

A further possibility for the process of this invention would be the use of a diaphragm cell. The fresh electrolyte is fed into each cathode compartment, where the zinc is removed from it and plated out on the cathode. The electrolyte then diffuses through the fabric separator bag into the anode section where the manganese is removed from the electrolyte. It is probable that a reduction in acid concentration at the cathode could be effected by this method.

While a preferred embodiment of this invention has been disclosed herein, those skilled in the art will appreciate that changes and modifications may be made therein without departing from the spirit and scope of this invention as defined in the appended claims.

What we claim is:
1. A process for the simultaneous electrolytic production of manganese dioxide and zinc comprising:
charging an aqueous solution consisting essentially of manganese sulphate and zinc sulphate in concentrations sufficient to limit concentration polarization into an electrolytic cell having a cathode upon which zinc can be plated and an anode upon which manganese dioxide can be plated,
heating the cell and its contents to a temperature within a range of which the upper limit is about 100° C. and of which the lower limit is about 75° C. and causing a current to flow between the anode and the cathode.

2. A process as in claim 1 wherein the said anode is of a material selected from graphite, lead and titanium and wherein the heating temperature of the cell is between about 75° C. and about 100° C. when the anode material is one selected from graphite and lead and wherein the heating temperature of the cell is between about 90° C. and 100° C. when the anode material is titanium.

3. A process as claimed in claim 2, in which the manganese sulphate concentration lies between about 0.5 molar and about 2.6 molar.

4. A process as claimed in claim 2, in which the zinc ion concentration lies between about 0.4 molar and about 2.6 molar.

5. A process as claimed in claim 2, in which the cathode material is aluminum.

6. A process as claimed in claim 2, in which the anode current density is between about 5 and about 25 amps. per sq. ft.

7. A process as claimed in claim 6, in which the cathode current density is between about 5 and about 50 amps. per sq. ft.

8. A process as claimed in claim 6, in which the manganese sulphate concentration varies from about 0.7 to about 1.6 molar and the zinc sulphate concentration varies from about 0.4 to about 1.1 molar.

9. A process as claimed in claim 8, in which the cathode material is aluminum.

10. A process as claimed in claim 9, in which the cathode current density is between about 5 and about 50 amps. per sq. ft.

11. A process as claimed in claim 6 in which the cathode current density is between about 10 and about 50 amps. per sq. ft.

12. A process as claimed in claim 9 in which the cathode current density is between about 5 and about 50 amps. per sq. ft.

References Cited

UNITED STATES PATENTS

| | | | |
|---|---|---|---|
| 1,055,157 | 3/1913 | French | 204—114 XR |
| 1,055,158 | 3/1913 | French | 204—83 |
| 2,772,230 | 11/1956 | Hollander et al. | 204—119 |
| 2,863,810 | 12/1958 | Henderson et al. | 204—119 |
| 2,913,377 | 11/1959 | Brown | 204—114 XR |

JOHN H. MACK, *Primary Examiner.*

D. R. JORDAN, *Assistant Examiner.*

U.S. Cl. X.R.
204—114, 119